US012651583B2

(12) United States Patent
Huang et al.

(10) Patent No.: US 12,651,583 B2
(45) Date of Patent: Jun. 9, 2026

(54) METHOD OF SYNCHRONIZING PERIPHERAL DEVICES OF A PROJECTOR

(71) Applicant: BENQ CORPORATION, Taipei City (TW)

(72) Inventors: Chih-Pen Huang, New Taipei City (TW); Ying-Tso Chen, Taipei City (TW)

(73) Assignee: BENQ CORPORATION, Taipei City (TW)

( * ) Notice: Subject to any disclaimer, the term of this patent is extended or adjusted under 35 U.S.C. 154(b) by 58 days.

(21) Appl. No.: 18/925,051

(22) Filed: Oct. 24, 2024

(65) Prior Publication Data

US 2025/0356822 A1 Nov. 20, 2025

(30) Foreign Application Priority Data

May 14, 2024 (TW) ................................. 113117676

(51) Int. Cl.
*G09G 5/12* (2006.01)
*G03B 21/00* (2006.01)
*G03B 21/20* (2006.01)

(52) U.S. Cl.
CPC ............. *G09G 5/12* (2013.01); *G03B 21/008* (2013.01); *G03B 21/2033* (2013.01)

(58) Field of Classification Search
CPC ..... G09G 5/12; G03B 21/008; G03B 21/2033
See application file for complete search history.

(56) References Cited

U.S. PATENT DOCUMENTS

2010/0149414 A1* 6/2010 Chen .................... H04N 7/0112
                                                            348/E7.003
2011/0157318 A1* 6/2011 Nalibotski ........... H04N 13/161
                                                            348/222.1

FOREIGN PATENT DOCUMENTS

TW          M347573          12/2008
TW          M347573 U    *  12/2008

* cited by examiner

*Primary Examiner* — Robert J Michaud
(74) *Attorney, Agent, or Firm* — Winston Hsu

(57) ABSTRACT

A method for synchronizing peripheral devices of a projector includes the projector receiving an image signal from an image output device to project an image, the projector generating a synchronization signal, the projector outputting the synchronization signal to an external image capturing device via a wired interface or a wireless interface, and the external image capturing device capturing the image projected by the projector according to the synchronization signal. The image signal has a refresh rate, and the frequency of the synchronization signal is generated according to the refresh rate.

12 Claims, 5 Drawing Sheets

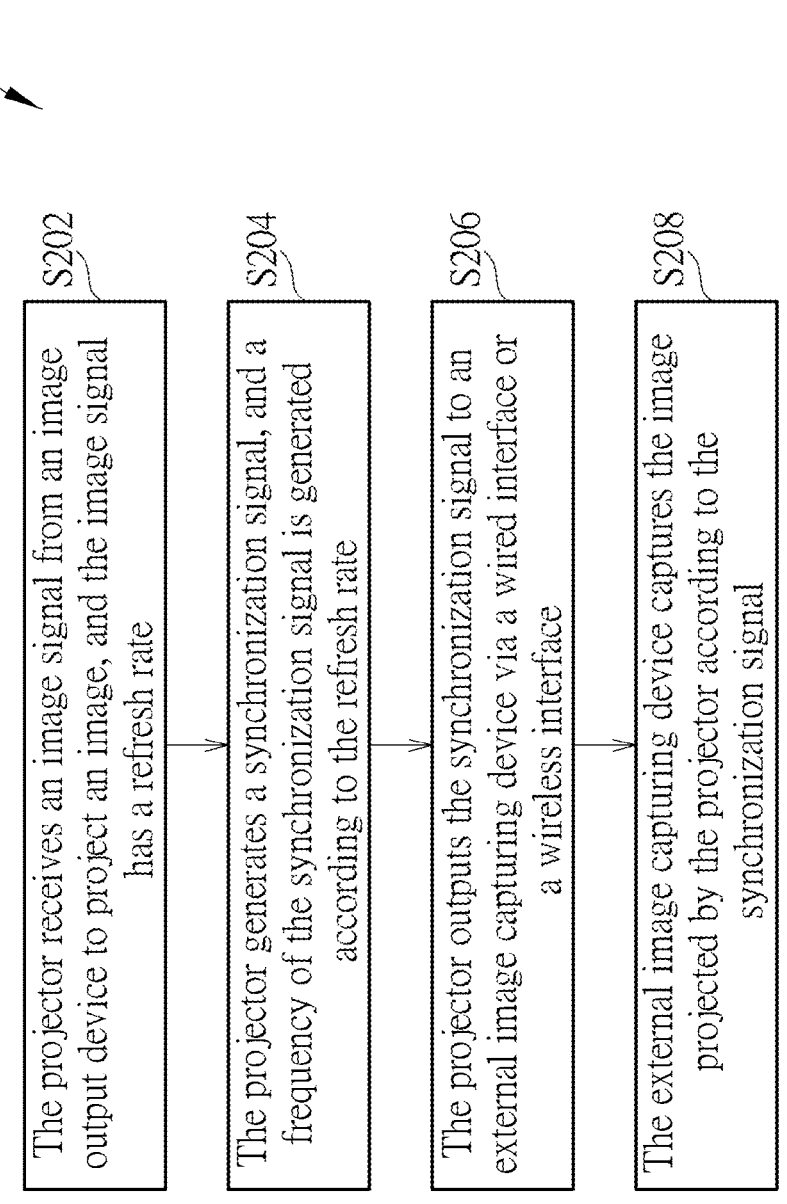

S202

The projector receives an image signal from an image output device to project an image, and the image signal has a refresh rate

S204

The projector generates a synchronization signal, and a frequency of the synchronization signal is generated according to the refresh rate

S206

The projector outputs the synchronization signal to an external image capturing device via a wired interface or a wireless interface

S208

The external image capturing device captures the image projected by the projector according to the synchronization signal

METHOD OF SYNCHRONIZING PERIPHERAL DEVICES OF A PROJECTOR

BACKGROUND OF THE INVENTION

1. Field of the Invention

The present invention relates to a method for synchronizing peripheral devices of a projector, and in particular to a method for synchronizing peripheral devices of a projector using synchronization signals.

2. Description of the Prior Art

Modern projectors primarily use three types of light sources: bulbs, LEDs (light-emitting diodes), and lasers. Each of these light sources has its own advantages and disadvantages, making them suitable for different applications.

Traditional projectors often use ultra-high-pressure mercury bulbs and xenon lamps. They have been on the market for the longest time and are considered a mature technology. They still hold a significant market share and are widely used in business, home theaters, engineering, and other fields. Bulb light sources can provide high brightness levels, reaching up to tens of thousands of lumens, and are relatively inexpensive, which helps reduce costs. However, they have a shorter lifespan compared to other light sources, typically lasting between 4,000 to 6,000 hours. Over time, their brightness declines, the screen may turn yellow, and color saturation decreases. In applications requiring long-term projection or high image quality, such as movie theaters, the t high cost of 1 amp replacement and maintenance can be a significant drawback.

Compared to traditional light bulbs, LED (light emitting diode) light bulbs offer several advantages, including energy savings, low heat generation, and long lifespan. They produce minimal heat, which reduces the need for extensive cooling systems in projectors, simplifies the internal optical path structure, and allows for a more compact projector design. However, LED light sources still face challenges in achieving higher brightness levels. As a result, they are primarily used in low-brightness micro projectors.

In recent years, laser projection light sources have transitioned from professional applications to general household use. Laser light sources offer high brightness and a lifespan of approximately 20,000 hours, significantly reducing maintenance costs. Unlike traditional lamp projectors, which require cooling time when turning on and off, laser projectors can start up instantly, greatly enhancing work efficiency. Additionally, they have no directional restrictions on installation, providing greater flexibility in setup. However, due to technical and cost issues, laser projectors are generally priced higher, making it challenging to replace traditional projection light sources in the short term.

Digital Light Processing (DLP) is a technology developed by Texas Instruments (TI) since 1987. It utilizes an optical element known as a Digital Micromirror Device (DMD). In single-chip DLP technology, the light source is condensed through a mask, focused by a lens, and then passes through a high-speed rotating color wheel for color separation before being directed onto the DMD chip. The digital values stored in the DMD chip's memory cause the tiny mirrors to tilt at specific angles, forming an image.

The use of DLP technology can produce the "rainbow effect," a phenomenon where the rapid rotation of the color wheel causes the three primary colors (red, green, and blue)

to split before forming a complete image on the retina. This results in rainbow-like afterimages. When using external capturing device to capture the projected image, the main image may be seen switching between different colors (red to green, green to blue, blue to red), which can cause noticeable screen flickering or gradual color changes. To capture the correct color image, it is necessary to use the synchronization signal sent by the projector.

SUMMARY OF THE INVENTION

In an embodiment, a method for synchronizing peripheral devices of a projector includes the projector receiving an image signal from an image output device to project an image, the projector generating a synchronization signal, the projector outputting the synchronization signal to an external image capturing device via a wired interface or a wireless interface, and the external image capturing device capturing the image projected by the projector according to the synchronization signal. The image signal has a refresh rate. The frequency of the synchronization signal is generated according to the refresh rate.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a flow chart of a method for synchronizing peripheral devices of the projector in FIG. 1.

DETAILED DESCRIPTION

Figure 1:
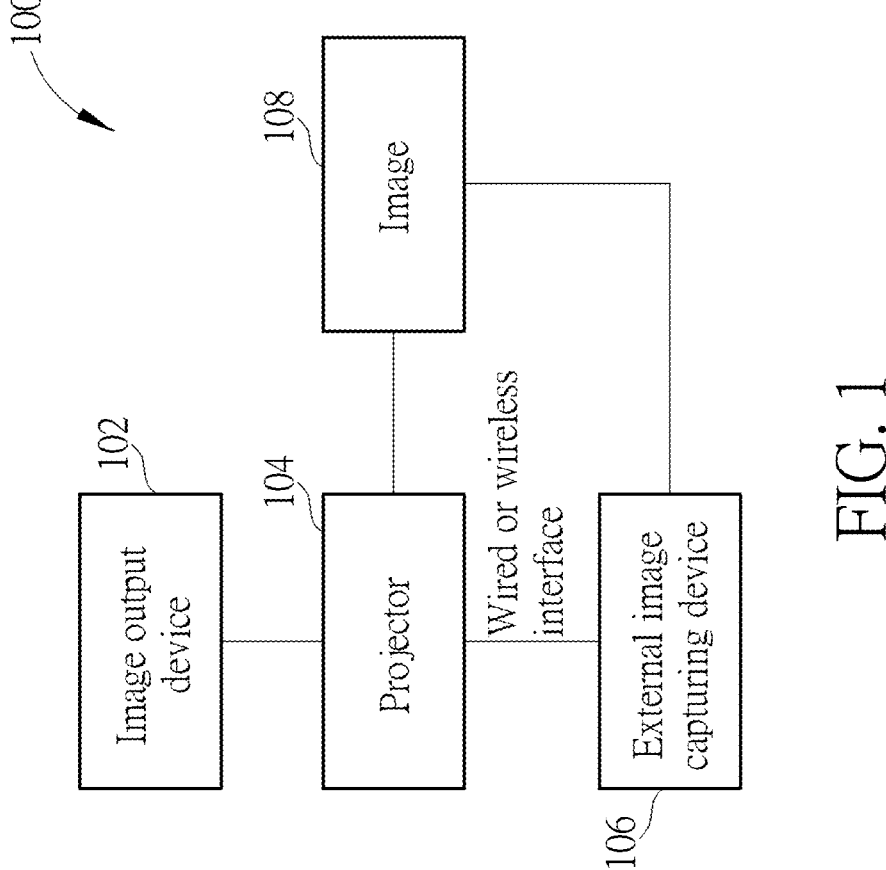
FIG. 1 is a block diagram of an image processing system according to an embodiment of the present invention.

FIG. 1 is a block diagram of an image processing system 100 according to an embodiment of the present invention. The image processing system 100 includes an image output device 102, a projector 104 and an external image capturing device 106. The image output device 102 may include a personal computer, a television, a digital versatile disc (DVD) player, a mobile phone or a tablet. The image output device 102 transmits image signals to the projector 104 through High Definition Multimedia Interface (HDMI), Video Graphics Array (VGA) or Universal Serial Bus (USB). After receiving the image signal, the projector 104 can analyze the refresh rate in the image signal, and round it to an integer to generate a synchronization signal. In an embodiment, the frequency of the synchronization signal may be a multiple of the rounded integer. Then, the projector 104 projects the image 108 according to the synchronization signal and transmits the synchronization signal to the external image capturing device 106 through a wired or wireless interface, so that the external image capturing device 106 records according to the synchronization signal. In one embodiment, the external image capturing device 106 may be a video recorder or a camera that can be triggered by a synchronization signal. In this way, the external image capturing device 106 can obtain images with correct colors without flickering or discoloration.

FIG. 2 is a flow chart of a method 200 for synchronizing peripheral devices of the projector 104 according to an embodiment of the present invention. The method 200 for synchronizing peripheral devices of the projector 104 includes the following steps:

Step S202: The projector 104 receives an image signal from the image output device 102 to project the image 108, and the image signal has a refresh rate;

Step S204: The projector 104 generates a synchronization signal, and the frequency of the synchronization signal is generated according to the refresh rate;

Step S206: The projector 104 outputs the synchronization signal to the external image capturing device 106 via a wired interface or a wireless interface; and Step S208: The external image capturing device 106 captures the image 108 projected by the projector 104 according to the synchronization signal.

In step S202, the image output device 102 outputs an image signal to the projector 104. The image signal has a refresh rate, and the refresh rate can be any frequency between 23 Hz and 240 Hz, such as 24 Hz, 60 Hz, 120 Hz, and 240 Hz. The image signal may be a High Definition Multimedia Interface (HDMI) signal, a Video Graphics Array (VGA) signal or a Universal Serial Bus (USB) signal. In step S204, the projector 104 generates a synchronization signal, and the frequency of the synchronization signal is generated according to the refresh rate. The refresh rate of the image signal can be rounded to an integer to generate the synchronization signal, or a multiple of the integer can be taken to be the frequency of the synchronization signal. For example, the refresh rate of 59.6 Hz is rounded to 60 Hz and doubled to 120 Hz. Therefore, for an image signal with a refresh rate of 59.6 Hz, the projector 104 synchronization signal can use a frequency of 120 Hz. In another example, the refresh rate of 24.1 Hz is rounded to 24 Hz, and three times this integer is 72 Hz. Therefore, for an image signal with a refresh rate of 24.1 Hz, the projector 104 synchronization signal can use a frequency of 72 Hz. In step S206, the projector 104 outputs the generated synchronization signal to the external image capturing device 106 via a wired interface or a wireless interface. The external image capturing device 106 may be a video recorder or a camera with an external signal triggering function. In step S208, the external image capturing device 106 captures the image 108 projected by the projector according to the synchronization signal provided by the projector. Since the video recorder or the camera is triggered by a synchronization signal, whose frequency is a multiple of the projection frequency of the projector 104, images with correct colors can be captured without flickering or discoloration of the screen.

Figure 3:
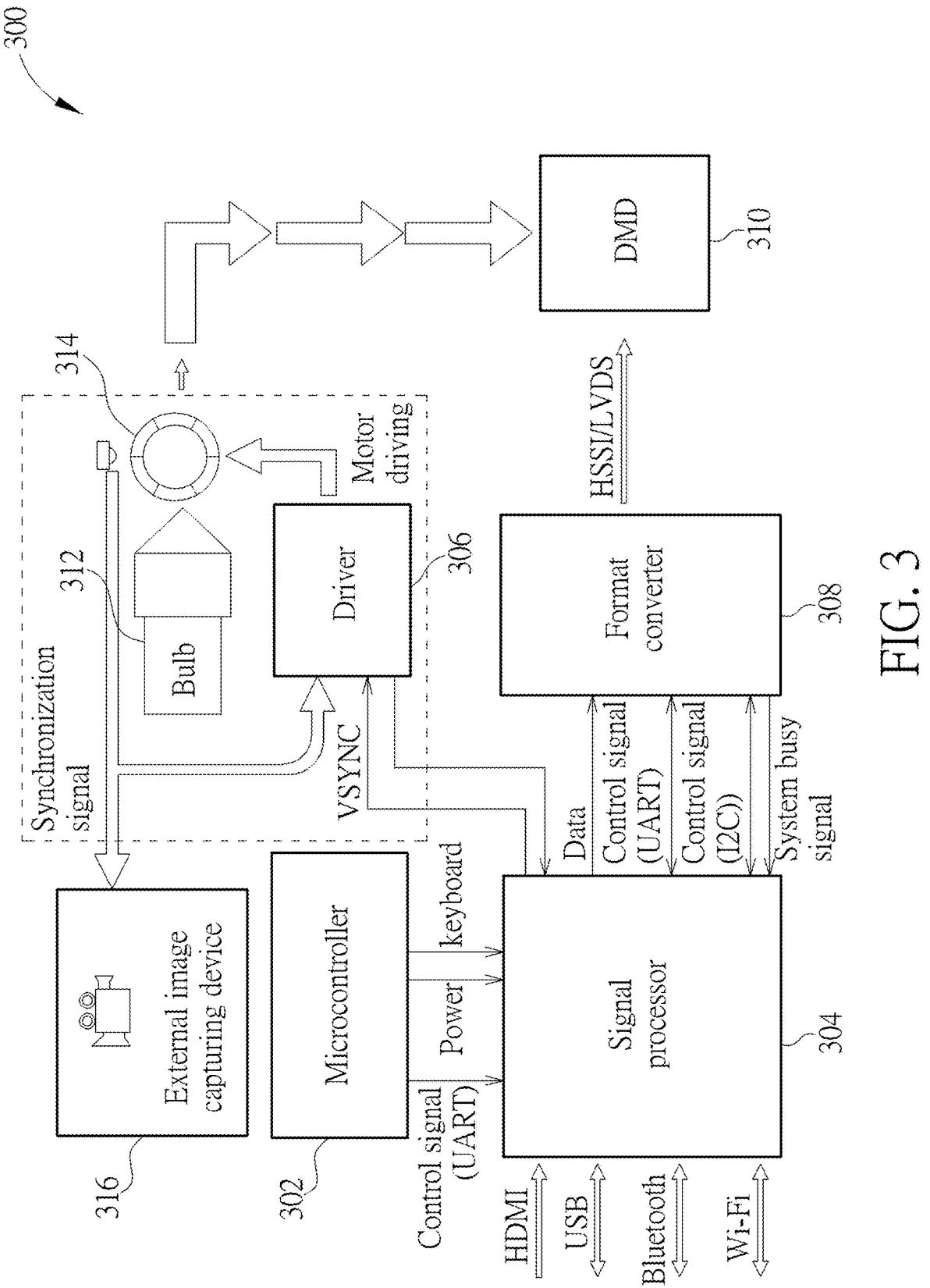
FIG. 3 is a block diagram for synchronizing peripheral devices of a lamp type projector according to an embodiment of the present invention.

FIG. 3 is a block diagram for synchronizing peripheral devices of a lamp type projector 300 according to an embodiment of the present invention. The lamp type projector includes a microcontroller 302, a signal processor 304, a driver 306, a format converter 308, a digital micromirror device (DMD) 310, a light bulb 312 and a color wheel 314. The microcontroller 302 is used to start the main program, control the signal processor 304, and provide power, keyboard signals and Universal Asynchronous Receiver/Transmitter (UART) control signals to control the signal processor 304 to process data. The signal processor 304 uses High Definition Multimedia Interface (HDMI), Video Graphics Array (VGA), Universal Serial Bus (USB), Bluetooth or Wi-Fi to receive image signals. The signal processor 304 receives the image signal and also receives the refresh rate of the image signal. By rounding the refresh rate and multiplying the rounded integer, the signal processor 304 can generate a vertical synchronization (VSYNC) signal to the driver 306. The driver 306 can drive the motor according to the VSYNC signal and generate a synchronization signal to the external image capturing device 316. While the motor rotates according to the VSYNC signal, the color wheel 314 can timely separate the colors of the light from the bulb 312 and drive the colored light into the imaging unit. In one embodiment, the imaging unit may be a digital micromirror device (DMD) 310. The driver 306 drives the motor to rotate according to the VSYNC signal so that the spectral frequency of the color wheel 314 is the same as the synchronization signal, and the driver 306 transmits the synchronization signal to the external image capturing device 316 through a wired or wireless interface. In one embodiment, the external image capturing device 316 is a video recorder or a camera that can be triggered by a synchronization signal. The synchronization signal of the lamp type projector 300 triggers recording, so that the frequency of recording is the same as the frequency of playing the images by the projector, so as to obtain correct color images. In addition, the signal processor 304 will transmit data and control signals to the format converter 308 through UART signals or inter-integrated bus circuit (I2C) signals, and the format converter 308 will then use high-speed serial interface (HSSI) or the low-voltage differential signaling (LVDS) to transmit the control signal to the DMD 310 to control the display of the projected images. When the format converter 308 is busy, the format converter 308 will send a system busy signal to the signal processor 304.

Figure 4:
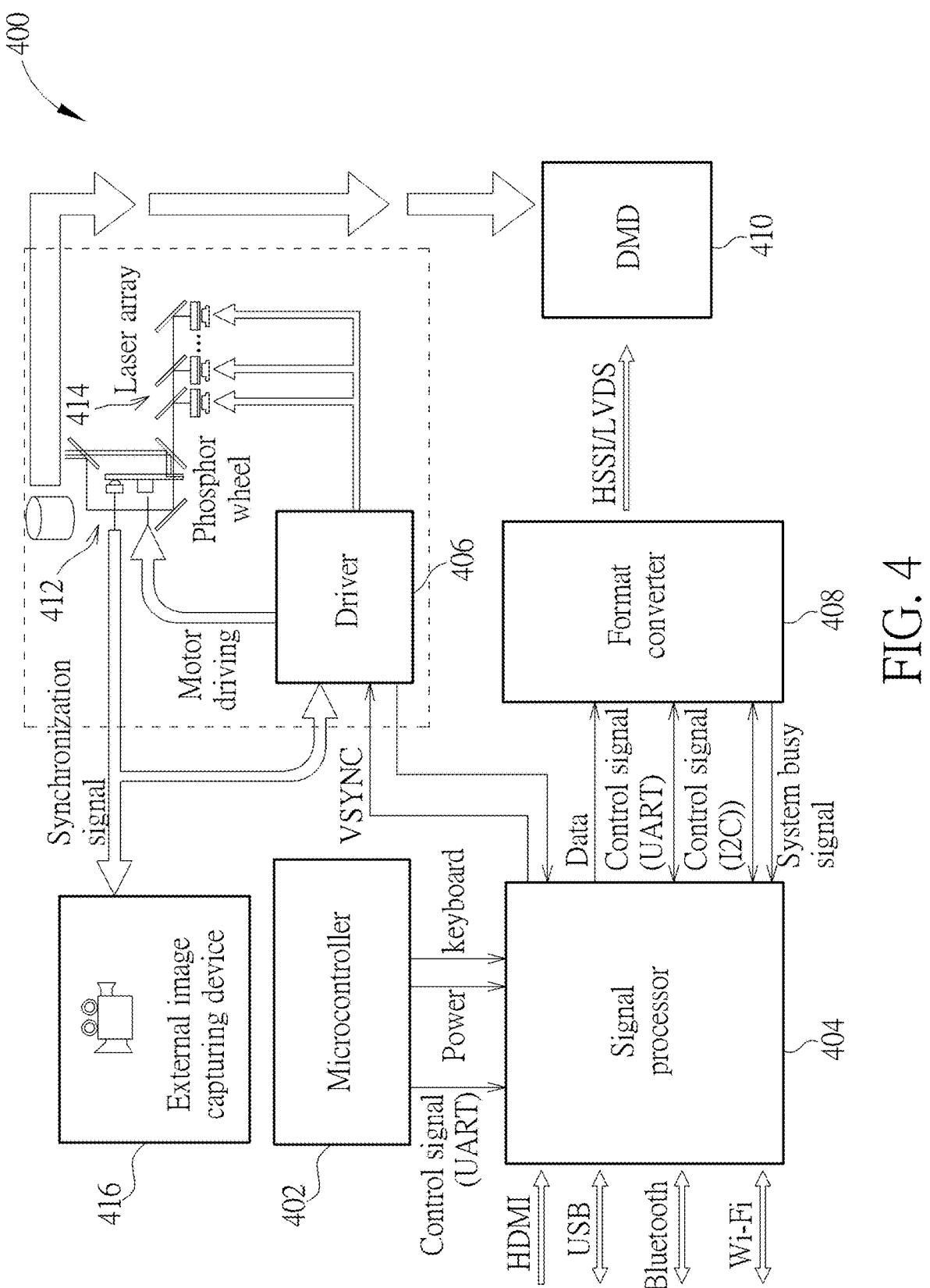
FIG. 4 is a block diagram for synchronizing peripheral devices of a composite light source projector according to an embodiment of the present invention.

FIG. 4 is a block diagram for synchronizing peripheral devices of a composite light source projector 400 according to an embodiment of the present invention. The composite light source projector includes a microcontroller 402, a signal processor 404, a driver 406, a format converter 408, a digital micromirror device (DMD) 410, a phosphorous wheel 412 and a laser array 414. The microcontroller 402 is used to start the main program, control the signal processor 404, and provide power, keyboard signals and UART control signals to control the signal processor 404 to process data. The signal processor 404 uses High Definition Multimedia Interface (HDMI), Video Graphics Array (VGA), Universal Serial Bus (USB), Bluetooth or Wi-Fi to receive image signals. When the signal processor 404 receives the image signal, it also receives the refresh rate of the image signal. By rounding the refresh rate and multiplying the rounded integer, the signal processor 404 can generate a VSYNC signal to the driver 406. The driver 406 can drive the motor and generate a synchronization signal to the external image capturing device 416 according to the VSYNC signal. While the motor rotates according to the VSYNC signal, the phosphorous wheel 412 can timely trigger the laser array 414 to emit different proportions of three primary color lights (red light, green light, blue light) and penetrate into the imaging unit. In one embodiment, the imaging unit is a digital micromirror device (DMD) 410. The driver 406 drives the motor to rotate according to the VSYNC signal so that the spectral frequency of the phosphorous wheel 412 is the same as the synchronization signal, and the driver 406 transmits the synchronization signal to the external image capturing device 416 through a wired or wireless interface. In one embodiment, the external image capturing device 416 is a video recorder or a camera that can be triggered by the synchronization signal. The recording is triggered by the synchronization signal of the composite light source projector 400, so that the frequency of recording is the same as the frequency of playing the images by the projector, thus obtaining the correct color images. In addition, the signal processor 404 will transmit data and control signals to the format converter 408 through UART signals or I2C signals, and the format converter 408 will then use a high speed serial interface (HSSI) or low voltage differential signaling (LVDS) to transmit a control signal to the DMD 410 to control the display of the projected images. When the format converter 408 is busy, the format converter 408 will send a system busy signal to the signal processor 404.

Figure 5:
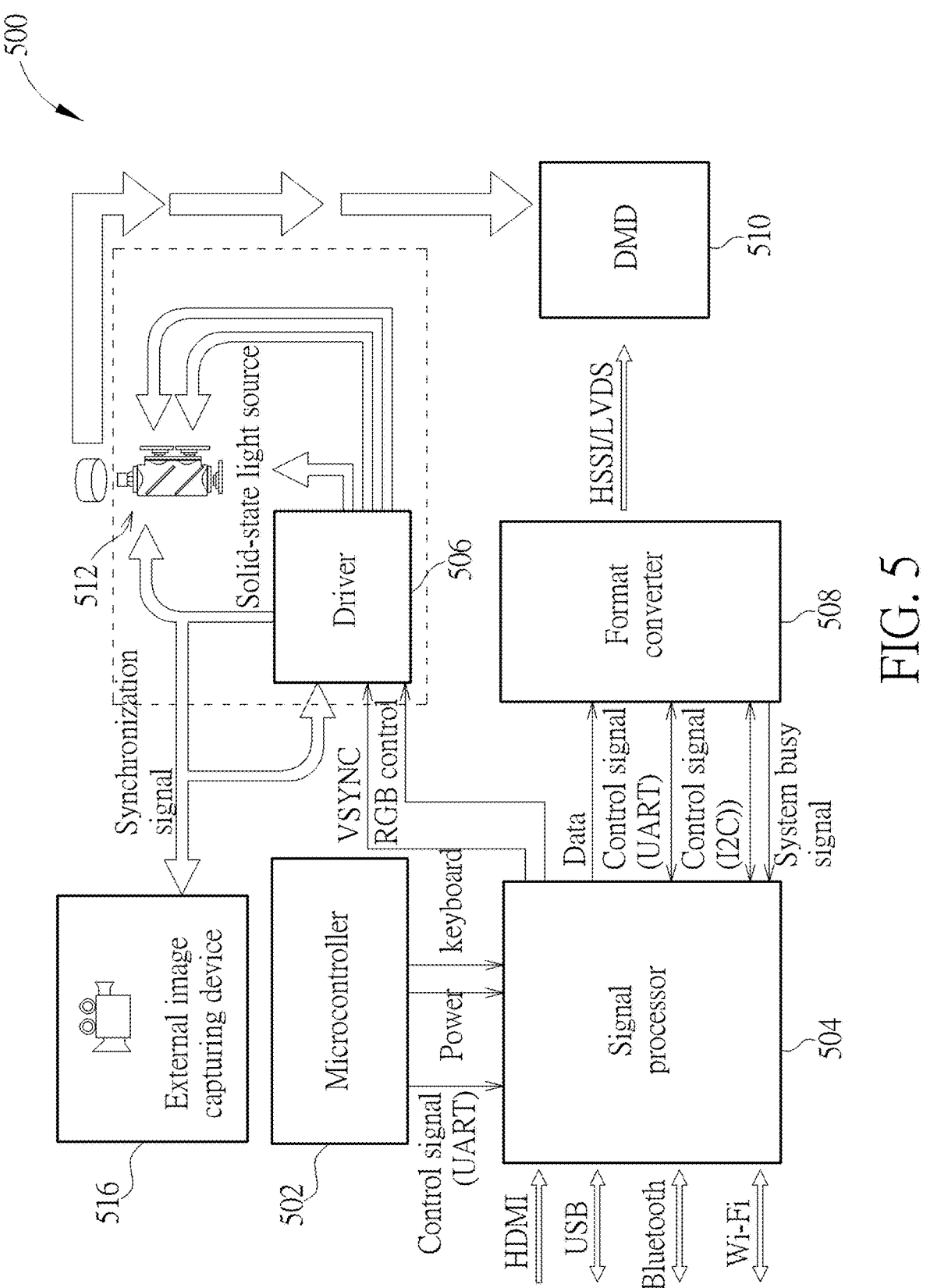
FIG. 5 is a block diagram for synchronizing peripheral devices of a solid-state light source projector according to an embodiment of the present invention.

FIG. 5 is a block diagram for synchronizing peripheral devices of a solid-state light source projector 500 according to an embodiment of the present invention. The solid-state light source projector includes a microcontroller 502, a signal processor 504, a driver 506, a format converter 508, a digital micromirror device (DMD) 510 and a solid-state light source 512. The microcontroller 502 is used to start the main program, control the signal processor 504, and provide power, keyboard signals and UART control signals to control the signal processor 504 to process data. The signal processor 504 uses High Definition Multimedia Interface (HDMI), Video Graphics Array (VGA), Universal Serial Bus (USB), Bluetooth or Wi-Fi to receive image signals. When the signal processor 504 receives the image signal, it also receives the refresh rate of the image signal. By rounding the refresh rate and multiplying the rounded integer, the signal processor 504 can generate a VSYNC (vertical synchronization) signal to the driver 506. The driver 506 can generate a pulse-width modulation (PWM) signal and a synchronization signal to the external image capturing device 516 according to the VSYNC signal. The solid-state light source 512 generates colored light of corresponding frequency according to the PWM signal, so that different proportions of the three primary color lights (red light, green light, and blue light) can be transmitted into the imaging unit. In one embodiment, the imaging unit is a DMD 510. The driver 506 drives the solid-state light source 512 according to the PWM signal at the same frequency as the synchronization signal, and the driver 506 transmits the synchronization signal to the external image capturing device 516 through a wired or wireless interface. In one embodiment, the external image capturing device 516 is a video recorder or a camera that can be triggered by the synchronization signal. The recording is triggered by the synchronization signal of the solid-state light source projector 500, so that the frequency of recording is the same as the frequency of playing the images by the projector 500, thus obtaining the correct color images. In addition, the signal processor 504 will transmit data and control signals to the format converter 508 through UART signals or I2C signals, and the format converter 508 will then use a high speed serial interface (HSSI) or a low voltage differential signaling (LVDS) to transmit a control signal to the DMD 510 to control the display of the projected images. When the format converter 508 is busy, the format converter 508 will send a system busy signal to the signal processor 504.

In summary, different types of projectors 104 can apply the present invention to round the refresh rate in image signals from HDMI, USB, VGA, Bluetooth or Wi-Fi, and multiplying the rounded integer to generate appropriate synchronization signal. The synchronization signal is then used to drive the external image capturing device 106 (a video recorder or a camera that can be controlled by the synchronization signal). In this way, the frequency of the projector 104 projecting images will be the same as the frequency of the external image capturing device 106 capturing images, thus obtaining the correct color images. The embodiment overcomes the problems of screen flickering and discoloration encountered in the prior art when capturing projection images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for synchronizing peripheral devices of a projector, comprising:
   the projector receiving image signals from an image output device, which are converted to project images onto a display with a refresh rate;
   the projector generating a synchronization signal, a frequency of the synchronization signal being generated according to the refresh rate;
   the projector outputting the synchronization signal to an external image capturing device via a wired interface or a wireless interface; and
   the external image capturing device capturing the images projected by the projector according to the synchronization signal;
   wherein the external image capturing device is a camera or a video recorder.

2. The method of claim 1, wherein the image output device is a personal computer, a television, a digital versatile disc (DVD) player, a mobile phone or a tablet.

3. The method of claim 1, wherein the refresh rate is between 23 Hz and 240 Hz.

4. The method of claim 1, further comprising rounding the refresh rate to an integer to generate the frequency of the synchronization signal.

5. The method of claim 1, further comprising rounding the refresh rate to an integer and using a multiple of the integer as the frequency of the synchronization signal.

6. The method of claim 1, wherein the projector is a lamp type projector, comprising:
   a signal processor, configured to generate the synchronization signal to the external image capturing device based on the image signals, and convert the image signals to output image data;
   a microcontroller, coupled to the signal processor, and configured to control operations of the signal processor;
   a driver, coupled to the signal processor, and configured to receive the synchronization signal and drive a color wheel to control a light bulb accordingly;
   a format converter, coupled to the signal processor, and configured to convert the image data into imaging data; and
   an imaging unit, configured to display images based on the imaging data.

7. The method of claim 6, wherein the imaging unit is a digital micromirror device (DMD).

8. The method of claim 1, wherein the projector is a composite light source projector, comprising:
   a signal processor, configured to generate the synchronization signal to the external image capturing device based on the image signals, and convert the image signals to output image data;
   a microcontroller, coupled to the signal processor, and configured to control operations of the signal processor;

a driver, coupled to the signal processor, and configured to receive the synchronization signal and drive a phosphorous wheel to control a monochromatic laser light source accordingly;

a format converter, coupled to the signal processor, and configured to convert the image data into imaging data; and an imaging unit, configured to display images based on the imaging data.

9. The method of claim 8, wherein the imaging unit is a digital micromirror device (DMD).

10. The method of claim 1, wherein the projector is a solid-state light source projector, comprising:

a signal processor, configured to generate the synchronization signal to the external image capturing device based on the image signals, and convert the image signals to output image data;

a microcontroller, coupled to the signal processor, and configured to control operations of the signal processor;

a driver, coupled to the signal processor, and configured to receive the synchronization signal and drive a frequency of a solid-state light source to control the solid-state light source;

a format converter, coupled to the signal processor, and configured to convert the image data into imaging data; and an imaging unit, configured to display images based on the imaging data.

11. The method of claim 10, wherein the imaging unit is a digital micromirror device (DMD).

12. The method of claim 1, wherein the image signals include a high definition multimedia interface (HDMI) signal, a video graphics array (VGA) signal or a universal serial bus (USB) signal.

* * * * *